United States Patent [19]

Frame

[11] 4,320,029

[45] Mar. 16, 1982

[54] CATALYTIC COMPOSITE, METHOD OF MANUFACTURE, AND PROCESS FOR USE

[75] Inventor: Robert R. Frame, Glenview, Ill.

[73] Assignee: UOP Inc., Des Plaines, Ill.

[21] Appl. No.: 169,553

[22] Filed: Jul. 17, 1980

[51] Int. Cl.³ .............................................. B01J 31/22
[52] U.S. Cl. ................................ 252/428; 252/431 C; 252/431 N; 208/206; 208/207
[58] Field of Search ................ 252/428, 431 C, 431 N

[56] References Cited

U.S. PATENT DOCUMENTS

| | | | |
|---|---|---|---|
| 2,918,426 | 12/1959 | Quiquerez et al. | 208/206 |
| 2,966,453 | 12/1960 | Gleim et al. | 208/206 |
| 2,988,500 | 6/1961 | Gleim et al. | 208/206 |
| 3,029,201 | 4/1962 | Brown et al. | 252/431 N X |
| 3,980,582 | 9/1976 | Anderson, Jr. et al. | 252/428 |
| 4,070,307 | 1/1978 | Carlson | 252/428 |
| 4,087,378 | 5/1978 | Carlson | 252/428 |
| 4,098,681 | 7/1978 | Carlson | 208/206 |
| 4,107,078 | 8/1978 | Carlson | 252/428 |
| 4,124,493 | 11/1978 | Frame | 208/206 |
| 4,124,531 | 11/1978 | Frame | 252/428 |
| 4,142,964 | 3/1979 | Carlson et al. | 208/206 |
| 4,156,641 | 5/1979 | Frame | 208/207 |
| 4,157,312 | 6/1979 | Frame | 252/431 N X |
| 4,159,964 | 7/1979 | Frame | 252/428 |
| 4,206,079 | 6/1980 | Frame | 252/431 N X |

*Primary Examiner*—Patrick Garvin
*Attorney, Agent, or Firm*—James R. Hoatson, Jr.; Gregory J. Mancuso; William H. Page II

[57] ABSTRACT

A catalytic composite especially useful in the treatment of sour petroleum distillates, comprising a carrier material, a metal chelate, a substituted ammonium compound, and a linear ionic compound. A method of preparing a catalytic composite comprising contacting a carrier material with a solution of a metal chelate, a substituted ammonium compound, and a linear ionic compound.

27 Claims, No Drawings

CATALYTIC COMPOSITE, METHOD OF MANUFACTURE, AND PROCESS FOR USE

BACKGROUND OF THE INVENTION

1. Field of the Invention

The field of art to which the claimed invention pertains is catalytic composites particularly useful in the treatment of sour petroleum distillates or fractions, the treatment being commonly referred to as sweetening. More specifically, the claimed invention relates to catalytic composites prepared by contacting a carrier material with a metal chelate solution, a substituted ammonium compound, and a linear ionic compound.

2. Description of the Prior Art

Processes for the treatment of a sour petroleum distillate, wherein said distillate is treated, in the presence of an oxidizing agent at alkaline reaction conditions, with a supported metal phthalocyanine catalyst disposed as a fixed bed in a treating or reaction zone, have become well known and widely accepted in the industry. The treating process is typically designed to effect the catalytic oxidation of offensive mercaptans contained in the sour petroleum distillate with the formation of innocuous disulfides. The oxidizing agent is most often air admixed with the sour petroleum distillate to be treated. Gasoline, including natural, straight run and cracked gasolines, is the most frequently treated sour petroleum distillate. Other sour petroleum distillates include the normally gaseous petroleum fraction as well as naphtha, kerosene, jet fuel, fuel oil, lube oil, and the like.

A commonly used continuous process for treating sour petroleum distillates entails treating the distillate in contact with a metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air. Sour petroleum distillates containing more difficulty oxidizable mercaptans are more effectively treated in contact with a metal phthalocyanine catalyst disposed on a high surface area adsorptive support—usually a metal phthalocyanine or an activated charcoal. The distillate is treated in contact with the supported metal phthalocyanine catalyst at oxidation conditions in the presence of an alkaline agent. One such process is described in U.S. Pat. No. 2,988,500. The oxidizing agent is most often air admixed with the distillate to be treated, and the alkaline agent is most often an aqueous caustic solution charged continuously to the process or intermittently as required to maintain the catalyst in a caustic-wetted state.

The prior art suggests that a way to improve the oxidation of mercaptans contained in sour petroleum distillates is the addition of specified additives to the metal phthalocyanine solutions employed in preparing the catalytic composites. The prior art discloses that a higher activity catalytic composite results from the use of a soluble acid amide (U.S. Pat. No. 4,098,681). A catalytic composite of improved activity has also been found to result from the inclusion of a carboxylic acid in a metal phthalocyanine solution (U.S. Pat. No. 4,087,378, U.S. Pat. No. 4,107,078). Other additives to the metal phthalocyanine solution which have been disclosed as providing a catalytic composite of higher activity are polynuclear aromatic sulfonic acid (U.S. Pat. No. 4,124,531), morpholine (U.S. Pat. No. 4,142,964), and an alkanolamine hydroxide (U.S. Pat. No. 4,159,964).

The prior art does not suggest however, that a catalytic composite useful in the treatment of a mercaptan-containing sour petroleum distillate can be prepared by contacting a carrier material with a solution of metal phthalocyanine, with a linear ionic compound, and with a substituted ammonium compound. Likewise, the prior art does not suggest a catalytic composite comprising a carrier material, a metal chelate, a substituted ammonium compound, and a linear ionic compound. The prior art also does not suggest the use of such a catalytic composite for the treating of mercaptan-containing sour petroleum distillates.

SUMMARY OF THE INVENTION

It is a broad objective of my invention to produce a novel catalyst of increased activity and stability compared with catalyst produced by prior art methods.

Another objective is to provide a process for treating a mercaptan-containing petroleum distillate in which said novel catalyst is used.

In brief summary, I have found that a catalyst especially useful in the treatment of sour petroleum distillates or fractions may be prepared by contacting a carrier material with a solution of a metal chelate, with a linear ionic compound, and with a substituted ammonium compound.

A more specific embodiment of the invention comprises the method recited in the preceding paragraph wherein the substituted ammonium compound is represented by the structural formula:

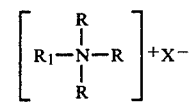

wherein R is a hydrocarbon radical containing up to about 20 carbon atoms and selected from the group consisting of alkyl, cycloalkyl, aryl, alkaryl and aralkyl, $R_1$ is a substantially straight-chain alkyl radical containing from about 5 to about 20 carbon atoms, and X is an anion selected from the group consisting of halide, nitrate, nitrite, sulfate, phosphate, acetate, citrate, tartrate and hydroxide.

Another embodiment of this invention is a catalytic composite comprising a carrier material, a metal chelate, a linear ionic compound, and a substituted ammonium compound.

One of the preferred embodiments of the invention is a method comprising contacting an activated charcoal adsorptive support with a cobalt phthalocyanine sulfonate solution, with a saturated linear ionic compound having from about 9 to about 24 carbon atoms, and with a dimethylbenzylalkylammonium chloride.

Another of the preferred embodiments of the invention is a method comprising contacting, in the presence of an alkaline reagent at oxidation conditions, a mercaptan-containing sour petroleum distillate with a catalytic composite prepared as set forth in the preceding paragraph.

Other objects and embodiments will become apparent in the following detailed description.

DESCRIPTION OF THE INVENTION

The carrier material herein contemplated includes the various and well-known adsorbent materials in general use as catalyst supports. Preferred carrier materials include the various charcoals produced by the destructive distillation of wood, peat, lignite, nut shells, bones, and other carbonaceous matter, and preferably such charcoals as have been heat treated, or chemically treated, or both, to form a highly porous particle structure of increased adsorbent capacity, and generally defined as activated charcoal. Said carrier materials also include the naturally occurring clays and silicates, for example, diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof, like silica-alumina, silica-zirconia, alumina-zirconia, etc. Any particular carrier material is selected with regard to its stability under conditions of its intended use. For example, in the treatment of a sour petroleum distillate, the carrier material should be insoluble in, and otherwise inert to, the petroleum distillate at alkaline conditions typically existing in the treating zone. Charcoal, and particularly activated charcoal, is preferred because of its capacity for metal phthalocyanine and because of its stability under treating conditions. However, it should be observed that the method of this invention is also applicable to the preparation of a metal chelate composited with any of the other well-known carrier materials, particularly the refractory inorganic oxides.

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g. cobalt tetrapyridinoporphyrazine; porphyrin and metaloporphyrin catalysts as described in U.S. Pat. No. 2,966,453, e.g. cobalt corrin sulfonate; chelate organometallic catalysts such as described in U.S. Pat. No. 2,918,426, e.g. the condensation product of an aminophenol and a metal of Group VIII; and the like. It is particularly preferred that metal phthalocyanines be used in the practice of the present invention.

The metal phthalocyanines which can be employed to catalyze the oxidation of mercaptans contained in sour petroleum distillates generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The metal phthalocyanine is more frequently employed as a derivative thereof, the commercially available sulfonated derivatives, e.g. cobalt phthalocyanine monosulfonate, cobalt phthalocyanine disulfonate or a mixture thereof being particularly preferred. The sulfonated derivatives may be prepared, for example, by reacting cobalt, vanadium, or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The substituted ammonium compounds which can be employed in this invention are those compounds having four hydrocarbon radicals wherein each of said radicals comprises from about 1 to about 20 carbon atoms. Such substituted ammonium compounds include tetramethylammonium hydroxide, tetraethylammonium hydroxide, tetrapropylammonium hydroxide, tetrabutylammonium hydroxide, trimethylethylammonium hydroxide, trimethylpropylammonium hydroxide, trimethylbutylammonium hydroxide, dimethyldiethylammonium hydroxide, dimethyldipropylammonium hydroxide, dimethyldibutylammonium hydroxide, methyltriethylammonium hydroxide, methyltripropylammonium hydroxide, methyltributylammonium hydroxide, phenyltrimethylammonium hydroxide, phenyltriethylammonium hydroxide, phenyltripropylammonium hydroxide, phenyltributylammonium hydroxide, benzyltrimethylammonium hydroxide, benzyltriethylammonium hyroxide, benzyltripropylammonium hydroxide, benzyltributylammonium hydroxide, diphenyldimethylammonium hydroxide, diphenyldiethylammonium hydroxide, diphenyldipropylammonium hydroxide, diphenyldibutylammonium hydroxide, dibenzyldimethylammonium hydroxide, dibenzyldiethylammonium hydroxide, dibenzyldipropylammonium hydroxide, dibenzyldibutylammonium hydroxide, triphenylmethylammonium hydroxide, triphenylethylammonium hydroxide, triphenylpropylammonium hydroxide, triphenylbutylammonium hydroxide, and the like. Suitable anionic constituents include, in addition to the hydroxide ion, chloride, nitrate, sulfate, phosphate, acetate, citrate, tartrate, and the like.

A preferred class of substituted ammonium compounds is represented by the structural formula:

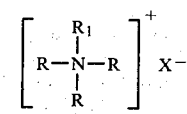

wherein R is a hydrocarbon radical containing up to about 20 carbon atoms and selected from the group consisting of alkyl, cycloalkyl, aryl, alkaryl and aralkyl, $R_1$ is a substantially straight chain alkyl radical containing from about 5 to about 20 carbon atoms, and X is an anion, for example, halide, hydroxide, nitrate, nitrite, sulfate, phosphate, acetate, citrate, tartrate, and the like. $R_1$ is preferably an alkyl radical containing from about 12 to about 18 carbon atoms, and X is preferably a halide or hydroxide. Especially preferred is a substituted ammonium hydroxide. Suitably substituted ammonium halides are described in U.S. Pat. No. 4,124,493. The particularly preferred substituted ammonium halide is a dimethylbenzylalkylammonium chloride. Substituted ammonium hydroxides which can give advantageous results include the hydroxides of the substituted ammonium halides listed in U.S. Pat. No. 4,124,493. The particularly preferred substituted ammonium hydroxide is dimethylbenzylalkylammonium hydroxide.

Particularly preferred substituted ammonium compounds are those represented by the structural formula set forth in the preceding paragraph wherein one of the R radicals is selected from the group consisting of aryl, aralkyl, and alkaryl. Especially preferred are substituted ammonium compounds wherein the $R_1$ straight chain alkyl radical contains from about 12 to about 18 carbon atoms, wherein one of the R groups is a benzyl radical, and wherein X is an hydroxide ion. Particularly preferred substituted ammonium hydroxides include those listed in U.S. Pat. No. 4,156,641.

The linear ionic compounds of this invention comprise straight chain compounds which dissociate to some degree in aqueous solution into cationic and anionic constituents. The anionic constituent preferably comprises an unbranched hydrocarbon having from about 9 to about 24 carbon atoms. The anionic constituent more preferably comprises a substantially saturated unbranched hydrocarbon having from about 9 to about 24 carbon atoms. It is especially preferred that the anionic constituent also comprise a sulfonate group, a sulfate group, or a carboxylate group. The cationic constituent may be any convenient cation. The linear ionic compound selected should be sufficiently soluble in aqueous solution to permit the formation of an aqueous solution comprising the selected quaternary ammonium compound in a concentration of from about 0.01 wt. % to about 10 wt. % and the selected linear ionic compound in a concentration of from about 0.001 wt. % to about 10 wt. %. The preferred cationic constituents are the alkali metals and ammonium. Especially preferred is sodium.

Representative of saturated linear ionic compounds which can produce satisfactory results in this invention are sodium nonyl sulfate, sodium nonyl sulfonate, sodium nonyl carboxylate, sodium decyl sulfate, sodium decyl sulfonate, sodium decyl carboxylate, sodium undecyl sulfate, sodium undecyl sulfonate, sodium undecyl carboxylate, sodium dodecyl sulfate, sodium dodecyl sulfonate, sodium dodecyl carboxylate, sodium tridecyl sulfate, sodium tridecyl sulfonate, sodium tridecyl carboxylate, sodium tetradecyl sulfate, sodium tetradecyl sulfonate, sodium tetradecyl carboxylate, sodium pentadecyl sulfate, sodium pentadecyl sulfonate, sodium pentacecyl carboxylate, sodium hexadecyl sulfate, sodium hexadecyl sulfonate, sodium hexadecyl carboxylate, sodium heptadecyl sulfate, sodium heptadecyl sulfonate, sodium heptadecyl carboxylate, sodium octadecyl sulfate, sodium octadecyl sulfonate, sodium octadecyl carboxylate, sodium nonadecyl sulfate, sodium nonadecyl sulfonate, sodium nonadecyl carboxylate, sodium eicosyl sulfate, sodium eicosyl sulfonate, sodium eicosyl carboxylate, sodium heneicosyl sulfate, sodium heneicosyl sulfonate, sodium heneicosyl carboxylate, sodium docosyl sulfate, sodium docosyl sulfonate, sodium docosyl carboxylate, sodium tricosyl sulfate, sodium tricosyl sulfonate, sodium tricosyl carboxylate, sodium tetracosyl sulfate, sodium tetracosyl sulfonate, and sodium tetracosyl carboxylate. As indicated above, cationic constituents such as ammonium and alkali metals other than sodium can provide satisfactory results. The preferred ionic compound is sodium dodecyl sulfate, commonly known as sodium lauryl sulfate.

Representative of unsaturated linear ionic compounds which can produce satisfactory results in the method of this invention are sodium nonenyl sulfate, sodium nonynl sulfate, sodium nonadienyl sulfate, sodium decenyl sulfate, sodium decynl sulfate, sodium decadienyl sulfate, sodium undecenyl sulfate, sodium undecynl sulfate, sodium undecadienyl sulfate, sodium dodecenyl sulfate, sodium dodecynl sulfate, sodium dodecadienyl sulfate, sodium tridecenyl sulfate, sodium tridecynl sulfate, sodium tridecadienyl sulfate, sodium tetradecenyl sulfate, sodium tetradecynl sulfate, sodium tetradienyl sulfate, sodium pentadecenyl sulfate, sodium pentadecynl sulfate, sodium pentadienyl sulfate, sodium hexadecenyl sulfate, sodium hexadecynl sulfate, sodium hexadienyl sulfate, sodium heptadecenyl sulfate, sodium heptadecynl sulfate, sodium heptadienyl sulfate, sodium octadecenyl sulfate, sodium octadecynl sulfate, sodium octadienyl sulfate, sodium nonadecenyl sulfate, sodium nonadecynl sulfate, sodium nonadienyl sulfate, sodium eicosadecenyl sulfate, sodium eicosadecynl sulfate, sodium eicosadienyl sulfate, sodium heneicosadecenyl sulfate, sodium heneicosadecynl sulfate, sodium heneicosadienyl sulfate, sodium docosadecenyl sulfate, sodium docosadecynl sulfate, sodium docosadienyl sulfate, sodium tricosadecenyl sulfate, sodium tricosadecynl sulfate, sodium tricosadienyl sulfate, sodium tetracosadecenyl sulfate, sodium tetracosadecynl sulfate, and sodium tetracosadienyl sulfate. Other unsaturated linear ionic compounds which can produce satisfactory results include the sulfonate and carboxylate analogues of the foregoing sulfates. Cationic constituents such as ammonium and alkali metals other than sodium can provide satisfactory results.

The linear ionic compounds are easily prepared by wellknown methods from several precursors, including alcohols, acids, and olefins. For example, a linear carboxylate salt can be prepared from the analogous carboxylic acid, which itself is commonly prepared from animal and vegetable fats. Thus sodium laurate is formed by the reaction of lauric acid and sodium hydroxide. Linear sulfates can be prepared by the reaction of sulfuric acid with the corresponding olefin or alcohol. Thus, lauryl alcohol reacts with sulfuric acid to form lauryl hydrogen sulfate, which can be neutralized with sodium hydroxide to form sodium lauryl sulfate. Similarly, the reaction of the corresponding olefin with sulfuric acid produces the hydrogen sulfate, which can be neutralized to the sodium sulfate compound. The sulfonate can be prepared by the reaction of sulfuric acid with the corresponding alkane, to produce a sulfonic acid which can be neutralized to a sulfonate salt. Alternatively, an alkyl sulfonic acid can be neutralized with sodium hydroxide to form the corresponding sodium alkyl sonfonate. Still another alternative is the sulfonation of an alkyl halide to form the desired compound.

As stated above, the method of preparation of this invention comprises contacting a carrier material with a solution of a metal chelate, with a linear ionic compound, and with a substituted ammonium compound. The contacting can be performed sequentially in any order or concurrently. If the contacting is performed concurrently, the metal chelate, linear ionic compound, and substituted ammonium compound are disposed in a common solution, and the carrier material contacted with that solution as discussed below. It is preferred that the common solution comprise an aqueous solution of the metal chelate, linear ionic compound, and substituted ammonium compound. It is especially preferred that the aqueous solution comprise an aqueous solution of ammonium hydroxide. It is preferred that the metal chelate be in a concentration of from about 0.1 wt.% to about 10 wt.% of the solution, that the linear ionic compound be in a concentration of from about 0.001 wt.% to about 10 wt.% of the solution, and that the substituted ammonium compound be in a concentration of from about 0.01 wt.% to about 10 wt.% of the solution. It is also preferred that the solution comprise from about 0.1 wt.% to about 5 wt.% sodium hydroxide.

The contacting of the carrier material with the metal chelate, substituted ammonium compound, and linear ionic compound can be performed concurrently by use of a common solution or sequentially by use of separate solutions. Thus, one embodiment of the method of this invention is a two-step process wherein the carrier material is contacted with a first solution of a metal chelate, and is thereafter contacted with a second solution of a linear ionic compound and a substituted ammonium compound. Another embodiment of the method of this invention is a single-step process wherein the carrier material is contacted with a common solution of a metal chelate, a substituted ammonium compound, and a linear ionic compound. In the preferred embodiment of the method of preparation of this invention, the carrier material is contacted with a first solution of a metal chelate and a linear ionic compound, and is thereafter contacted with a second solution of a substituted ammonium compound.

It is preferred that the solutions comprise aqueous solutions. It is especially preferred that the solution of metal chelate comprise an aqueous solution of from about 0.1 wt.% to about 5 wt.% sodium hydroxide. It is preferred that the metal chelate comprise from about 0.1 wt.% to about 10 wt.% of the solution in which it is present. It is preferred that the linear ionic compound comprise from about 0.001 wt.% to about 10 wt.% of the solution in which it is present. It is preferred that the substituted ammoniun compound comprise from about 0.01 wt.% to about 10 wt.% of the solution in which it is present.

In the practice of the method of preparation of this invention it is preferred that the contacting of the carrier material with the substituted ammonium compound be performed at a temperature above ambient temperature and below the temperature of thermal decomposition of the substituted ammonium compound. It is especially preferred to conduct the contacting at a temperature of from about 55° C. to about 110° C. While the mechanism of activation is not completely understood, it is believed that the advantageous results arising from the method of this invention are a result in part of the interaction of the quaternary ammonium compound and linear ionic compound with the metal chelate. It is further believed that conducting the contacting at a temperature within the range hereinabove specified facilitates that interaction.

The amount of metal chelate, linear ionic compound, and substituted ammonium compound relative to the amount of carrier material in the catalytic composite of this invention can vary widely and still yield advantageous results. Advantageous results can be achieved when the amount of metal chelate is up to about 25 wt.% of the amount of carrier material. It is preferred that the amount of metal chelate be from about 0.1 wt.% to about 10 wt.% of the amount of carrier material. Advantageous results can be achieved when the amount of substituted ammonium compound is from about 0.1 wt.% to about 10 wt.% of the amount of carrier material. The amount of linear ionic compound should be from about 0.01 wt.% to about 10 wt.% of the amount of carrier material.

The linear ionic compound, the substituted ammonium compound, and the metal chelate components can be disposed on the carrier material in any conventional or otherwise convenient manner. Said components can be disposed on the carrier material simultaneously from a common solution or dispersion thereof, or separately and in any desired sequence. The disposition process can be effected utilizing conventional techniques whereby the carrier material in the form of spheres, pills, pellets, granules or other particles of uniform or irregular size or shape, is soaked, suspended, dipped one or more times, or otherwise immersed in a solution or dispersion to dispose a given quantity of the linear ionic compound, substituted ammonium compound, and metal chelate components thereon. One preferred method involves the use of a steam-jacketed rotary dryer. The carrier material is immersed in the solution or dispersion contained in the dryer and the carrier material is tumbled therein by the rotating motion of the dryer. Evaporation of the solution in contact with the tumbling carrier material is expedited by applying steam to the dryer jacket. In any case, the resulting composite is allowed to dry under ambient temperature conditions, or dried at an elevated temperature in an oven, or in a flow of hot gases, or in any other suitable manner.

An alternative and convenient method for disposing the linear ionic compound, substituted ammonium compound, and metal chelate components on the carrier material comprises predisposing the carrier material in a sour petroleum distillate treating zone or chamber as a fixed bed and passing the linear ionic compound, metal chelate and substituted ammonium compound solutions or dispersions through the bed in order to form the catalytic composite in situ. This method allows the solutions or dispersions to be recycled one or more times to achieve a desired concentration of the linear ionic compound, substituted ammonium compound, and metal chelate components on the carrier material. In still another alternative method, the carrier material may be predisposed in said treating zone or chamber, and the zone or chamber thereafter filled with the solutions or dispersions to soak the support for a predetermined period.

Treatment of sour petroleum distillates in contact with the catalytic composite of this invention is performed in the presence of an alkaline agent and an oxidizing agent. The catalytic composite is initially saturated with an alkaline agent, and an alkaline agent thereafter passed in contact with the catalyst bed, continuously or intermittently as required, admixed with the sour petroleum distillate. Any suitable alkaline agent may be employed. An alkali metal hydroxide in aqueous solution, e.g. sodium hydroxide in aqueous solution, is most often employed. The solution may further comprise a solubilizer to promote mercaptan solubility, e.g. alcohol, and especially methanol, ethanol, n-propanol, isopropanol, etc., and also phenols, cresols, and the like. The solubilizer, when employed, is preferably methanol, and the alkaline solution may suitably comprise from about 2 to about 100 vol.% thereof. Sodium hydroxide and potassium hydroxide constitute the preferred alkaline agents. Others including lithium hydroxide. rubidium hydroxide and cesium hydroxide are also suitably employed.

The method of treating of this invention can be effected in accordance with prior art treating conditions. The process is usually effected at ambient temperature conditions, although higher temperatures up to about 105° C. are suitably employed. Pressures of up to about 1,000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. In fixed bed treating operations, the sour petroleum distillate may be passed upwardly or downwardly through the catalytic composite. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

As heretofore mentioned, the linear ionic compound, substituted ammonium compound, and metal chelate components of the catalytic composite of this invention are readily disposed on the carrier material. Thus, any of the said components which may in time be leached from the carrier material and carried away in the reactant stream can be easily restored to the catalytic composite in situ by introducing either or any of said components to the sweetening process, for example, in admixture with the distillate being treated to be disposed on the solid adsorbent support in the treating zone.

The following examples are presented in illustration of preferred embodiments of this invention and are not intended as undue limitations on the generally broad scope of the invention as set out in the appended claims.

EXAMPLE I

This example illustrates a preferred embodiment of the catalytic composite of this invention and the method of preparation of this invention. A solution is prepared by mixing together 0.2 grams of commercial grade (about 85% purity) monosulfonated cobalt, phthalocyanine, 0.05 grams of sodium lauryl sulfate, 0.25 grams of mixed benzyldimethylalkylammonium hydroxides, 1 cc of 27 wt.% aqueous ammonia, and sufficient deionized water to form 125 cc of solution. About 100 cc of 10×30 mesh activated charcoal particles is immersed in the solution in a rotary evaporator, and tumbled therein for about 1 hour by the rotating motion of the evaporator. Steam is thereafter applied to the evaporator jacket and the solution is evaporated to dryness in contact with the charcoal particles.

EXAMPLE II

In this example, illustrating another embodiment of this invention, the carrier material used was a catalytic composite which had been substantially deactivated in a kerosene treating operation. The deactivated catalytic composite retained some ability to convert mercaptan sulfur to disulfides. However, the activity of the catalytic composite was very low, being insufficient to yield an acceptable kerosene product. The catalyst originally consisted of about 0.5 wt.% cobalt phthalocyanine monosulfonate and about 18 wt.% quaternary ammonium chloride, disposed on 10×30 mesh activated charcoal particles of an apparent bulk density of about 0.25 gm/cc.

The deactivated composite was disposed as a fixed bed in a vertical tube, and flushed with about 600 cc of water at about 100° C. to remove gum and other contaminants. Thereafter, 125 cc of a solution comprising 0.15 gm of commercial grade (about 85% purity) monosulfonated cobalt phthalocyanine, 0.05 gm of sodium lauryl sulfate, 1 cc of 27 wt.% aqueous ammonia, and the balance deionized water, was charged down-flow through the catalyst bed, and recycled until it lost substantially all of its color. Thereafter, about 600 cc of a solution comprising 0.25 gms of mixed benzyldimethylalkylammonium hydroxides, wherein the alkyl substituent was a straight chain $C_{12}$–$C_{18}$ alkyl substituent, in water at a temperature of about 100° C., was charged down-flow through the catalyst bed. The catalyst bed was wetted with about 10 cc of a 7 wt.% aqueous caustic solution, 10 cc of said solution being substantially charged to the catalyst bed at about 12 hour intervals admixed with the kerosene charged thereto.

The catalytic composite was evaluated with respect to a sour kerosene fraction having an end-boiling point of 486° F. and containing 873 ppm by weight mercaptan sulfur. The kerosene was charged down-flow through 100 cc of the catalytic composite disposed as a fixed bed in a vertical tubular reactor, the kerosene being charged at a liquid hourly space velocity of about 0.5 under 45 psig of air—sufficient to provide about 1.5 times the stoichiometric amount of oxygen required to oxidize the mercaptans contained in the kerosene. The kerosene was analyzed for mercaptan content periodically over a period of 200 hours on stream. During that 200 hour period the mercaptan content of the treated kerosene stream averaged about 3 ppm by weight. At the end of the 200 hour period the mercaptan content of the treated kerosene was about 5 ppm by weight. The deactivated catalytic composite which served as a carrier in this example has yielded a kerosene product of about 40 ppm by weight mercaptan.

It is believed that the deactivated catalytic composite which served as a carrier material in this example had been substantially depleted of all quaternary ammonium chloride, and a substantial portion of its original cobalt phthalocyanine monosulfonate constituent. It is believed that the deactivated catalytic composite contained no activating constituents other than trace amounts of cobalt phthalocyanine monosulfonate. Therefore, it is believed that the results of the run of this Example II are substantially similar to results which would have been obtained had an activated charcoal been used as a carrier instead of the carrier material used in this example.

I claim as my invention:

1. A catalytic composite comprising a carrier material, a metal chelate oxidation catalyst, a linear organic compound containing from about 9 to about 24 carbon atoms and having an anionic portion, wherein said anionic portion is selected from the group consisting of sulfonate, sulfate and carboxylate and a substituted ammonium compound represented by the structural formula

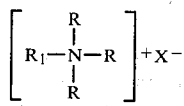

wherein R is a hydrocarbon radical containing up to about 20 carbon atoms and selected from the group consisting of alkyl, cycloalkyl, aryl, alkaryl and aralkyl, $R_1$ is a substantially straight-chain alkyl radical containing from about 5 to about 20 carbon atoms, and X is an anion selected from the group consisting of halide, nitrate, nitrite, sulfate, phosphate, acetate, citrate, tartrate and hydroxide.

2. The catalytic composite of claim 1 wherein said linear ionic compound possesses a cationic portion and wherein said portion is selected from the group consisting of alkali metals and ammonium.

3. The catalytic composite of claim 1 wherein one of the R groups of said substituted ammonium compound is selected from the group consisting of aryl, aralkyl, and alkaryl.

4. The catalytic composite of claim 1 wherein said substituted ammonium compound is a benzyldimethylalkylammonium hydroxide wherein the alkyl substituent is a substantially straight-chain alkyl radical containing from about 12 to about 18 carbon atoms.

5. The catalytic composite of claim 4 wherein said linear ionic compound comprises a saturated linear ionic compound having from about 9 to about 24 carbon atoms.

6. The catalytic composite of claim 4 wherein said linear ionic compound is selected from the group consisting of sodium undecyl sulfate, sodium dodecyl sulfate, and sodium tridecyl sulfate.

7. The catalytic composite of claim 1 wherein said carrier material is an activated charcoal.

8. The catalytic composite of claim 1 wherein said metal chelate oxidation catalyst is a metal phthalocyanine.

9. The catalytic composite of claim 1 wherein said metal chelate oxidation catalyst is a cobalt phthalocyanine.

10. The catalytic composite of claim 1 wherein said metal chelate oxidation catalyst is a cobalt phthalocyanine sulfonate.

11. The catalytic composite of claim 1 wherein said composite comprises from about 0.01 wt. % to about 10 wt. % substituted ammonium compound, and from about 0.001 wt. % to about 10 wt. % linear ionic compound.

12. A method of preparing a supported metal chelate catalyst which comprises contacting a carrier material with a solution of a metal chelate oxidation catalyst, with a linear ionic compound containing from about 9 to about 24 carbon atoms and having an anionic portion, wherein said anionic portion is selected from the group consisting of sulfonate, sulfate and carboxylate and with a substituted ammonium compound represented by the structural formula wherein R is a hydrocarbon radical containing up to about 20 carbon atoms and is selected from the group consisting of alkyl, cycloalkyl, aryl, alkaryl and aralkyl, $R_1$ is a substantially straight chain alkyl radical containing from about 5 to about 20 carbon atoms, and X is an anion selected from the group consisting of halide, nitrate, nitrite, sulfate, phosphate, acetate, citrate, tartrate and hydroxide.

13. The method of claim 12 wherein said linear ionic compound possesses a cationic portion and wherein said portion is selected from the group consisting of alkali metals and ammonium.

14. The method of claim 12 wherein one of the R groups of said substituted ammonium compound is selected from the group consisting of aryl, aralkyl, and alkaryl.

15. The method of claim 12 wherein said substituted ammonium compound is a dimethylbenzylalkylammonium hydroxide wherein the alkyl substituent is a substantially straight chain alkyl radical containing from about 5 to about 20 carbon atoms.

16. The method of claim 12 wherein said substituted ammonium compound is a dimethylbenzylalkylammonium hydroxide wherein the alkyl substituent is a substantially straight chain alkyl radical containing from about 12 to about 18 carbon atoms.

17. The method of claim 12 wherein said substituted ammonium compound is a substituted ammonium hydroxide.

18. The method of claim 12 wherein said linear ionic compound comprises a saturated linear ionic compound having from about 9 to about 24 carbon atoms.

19. The method of claim 12 wherein said linear ionic compound is selected from the group consisting of sodium undecyl sulfate, sodium dodecyl sulfate, and sodium tridecyl sulfate.

20. The method of claim 12 wherein said carrier material is an activated charcoal.

21. The method of claim 12 wherein said metal chelate is a metal phthalocyanine.

22. The method of claim 12 wherein said metal chelate oxidation catalyst is a cobalt phthalocyanine.

23. The method of claim 12 wherein said metal chelate oxidation catalyst is a cobalt phthalocyanine sulfonate.

24. The method of claim 12 wherein said carrier material is contacted with a first solution of a metal chelate oxidation catalyst and a linear ionic compound, and thereafter contacted with a second solution of a substituted ammonium compound.

25. The method of claim 24 wherein said second solution is maintained at a temperature of from about 55° C. to about 110° C.

26. The method of claim 24 wherein said first solution comprises an aqueous solution of ammonium hydroxide, a metal chelate oxidation catalyst and a linear ionic compound wherein said ammonium hydroxide comprises from about 0.1 wt. % to about 5 wt. % of said solution, said metal chelate oxidation catalyst comprises from about 0.1 wt. % to about 10 wt. % of said solution, and said linear ionic compound comprises from about 0.001 wt. % to about 10 wt. %.

27. The method of claim 26 wherein said second solution comprises an aqueous solution of from about 0.01 wt. % to about 10 wt. % of a quaternary ammonium compound.

* * * * *